Patented Dec. 15, 1953

2,662,865

UNITED STATES PATENT OFFICE 2,662,865

COATING COMPOSITION COMPRISING A POLYAMIDE AND A PHENOL-FORMALDEHYDE RESIN DISSOLVED IN AN AQUEOUS ALCOHOL SOLUTION

David N. Beauchamp, Whittier, Calif., assignor to The Sherwin-Williams Company, Cleveland, Ohio, a corporation of Ohio No Drawing. Application May 31, 1950, Serial No. 165,373

4 Claims. (Cl. 260—29.3)

This invention relates as indicated to a new lacquer composition which is particularly resistant to certain recently developed non-flammable hydraulic fluids of the type characterized by the presence of an organic ester of phosphoric acid.

For some time now, the various control mechanisms of both passenger and military aircraft have been operated by hydraulic systems, which systems for a long time carried media which were highly flammable and impossible to confine to a single compartmented area.

Demands for increased safety to airline passengers and personnel have resulted in the development of non-flammable hydraulic fluids to replace the unsafe materials heretofore employed. One of the principal ingredients of these new fluids is a phosphate ester, particularly the type which is oil-soluble, such as tricresyl phosphate, one of the best solvent type plasticizers known to the paint industry. Ordinary lacquers are incapable of withstanding prolonged exposure to such phosphate esters and fluids containing them.

It is, therefore, a principal object of this invention to provide a lacquer base which is useful in the formulation of lacquer compositions and which will resist the solvent action of organic phosphate esters.

Another object of this invention is to provide a lacquer base which is useful in the formulation of lacquer compositions which will resist the solvent action of organic phosphate ester-containing non-flammable hydraulic fluids currently on the market.

Another object of this invention is to provide a clear lacquer which will, when applied to a surface subject to exposure to phosphate ester-containing organic fluids, resist the solvent action which is normally a property of such materials.

Another object of this invention is to provide a pigmented lacquer composition which will, when applied to a surface subject to exposure to phosphate ester-containing hydraulic fluids, resist the solvent action of said fluids.

Still another object of my invention is to provide clear and pigmented lacquer compositions which are not only resistant to the solvent action of organic phosphate esters and materials containing the same, but which are also water resistant.

Another object of my invention is to provide a suitable solvent system for the lacquer base of my invention.

Other objects of my invention will appear as the description proceeds.

To the accomplishment of the foregoing and related ends, said invention, then, consists of the means hereinafter fully described and particularly pointed out in the appended claims, the following description setting forth in detail certain embodiments of the invention, such disclosed means constituting, however, but a few of the various forms in which the principle of my invention may be employed.

I have discovered that a combination of a polymeric amide and a catalytically curing phenolic resin in homogeneous solution is useful in the formulation of clear and pigmented varnishes and imparts to said varnishes improved properties of adhesion, water resistance, and organic phosphate ester-containing fluid resistance. Lacquers, or varnishes, formulated from the above described base composition have been found to set to touch in approximately 1 to 2 hours, and form a water resistant, durable, flexible film, resistant to the solvent action of phosphate ester-containing fluids. Satisfactory adhesion has been obtained to both bare and primed metal surfaces such as zinc chromate primed aluminum.

Broadly stated, therefore, my invention comprises compositions of matter, suitable for use in the formulation of clear and pigmented coating compositions, comprising in combination in homogeneous solution from about 10% to about 33% of a polymeric amide, and from about 90% to about 66% of a catalytically curing phenolic resin. These percentages are on the dry basis. More particularly, my invention comprises clear and pigmented lacquers containing the combination of a polymeric amide and a catalytically curing phenolic resin in stable homogeneous solution in the proportions of from about 10 parts to about 33 parts of the polymeric amide to about 90 parts to about 66 parts of the catalytically curing phenolic resin, on the dry basis.

A more specific embodiment of my invention comprises compositions of matter, suitable for use in the formulation of clear and pigmented coating compositions, comprising a stable, homogeneous mixture of (a) a polymeric amide solution produced by mixing (1) a solution of a polymeric amide resin of an alkylene diamine of from 2 to 6 carbon atoms and a polybasic aliphatic acid usually of from 2 to 8 carbon atoms in approximately 85% aliphatic alcohol aqueous solution containing from 10% to 20% solids and (2) a stabilizer solution comprising from 5% to 30% by weight of the entire polymeric amide solution, said stabilizer being a halogen-containing organic compound of from 1 to 7 carbon atoms, and containing a plurality of halogen atoms; and (b) an aqueous solution of a phenol-aldehyde resin, said components (a) and (b) being in a weight ratio of from about 40:60 to about 60:40, respectively, calculated as the aqueous solutions.

The compositions of this invention depend upon a long chain synthetic polymeric amide, such as, for example, the reaction product of adipic acid and hexamethylenediamine. The addition of a rather slow curing phenolic resin, e. g. phenol-formaldehyde resin curing at from 2 to 5 days at room temperature, depending upon atmospheric conditions, appears to increase the solids content "at the gun" and is believed to contribute adhesion, water resistance, and durability without loss of the organic phosphate ester resistant properties of the polymeric amide. It is believed that sufficient initial polymerization takes place simultaneously with the addition of an acidic curing catalyst, such as a mineral acid, e. g. dilute phosphoric acid, or sulphuric acid, to allow the polymeric amide-phenol-aldehyde composition to resist the action of the organic phosphate ester until the phenolic resin cures to an insoluble infusible resin. These critical ingredients will be discussed in more detail hereinafter.

The clear varnishes produced in accordance with the more particular description given below may be pigmented according to the general practice of the industry with the exception that it has been found that care must be utilized in the selection of the pigments to be employed to insure that when compounded in the compositions of this invention they are substantially insoluble in the hydraulic fluid and resistant to the action of the acidic materials. Pigments found suitable for use in this composition, for example, include titanium dioxide and iron blue. An example of a pigment which may not be used to advantage herein is toluidine red. This latter pigment is somewhat soluble in the hydraulic fluid and would allow penetration of the coating by the organic phosphate ester-containing material with the resultant deterioration of the coating and any primer under it. Additional pigments which have sufficiently satisfactory acid resistance to withstand the acid catalyst in the phenol-aldehyde resin and are also sufficiently insoluble in organic phosphate ester-containing fluids include red iron oxide, cadmium red, cadmium yellow, permansa green B (iron complex of 1-nitroso-2-naphthol), carbon black, lampblack, ferrite yellow, chromium oxide, talc, barytes. Thus, the preferred pigmentary materials of this invention are those which are substantially acid resistant and also insoluble in and unreactive toward organic phosphate esters.

It becomes convenient to discuss in greater detail, the polyamide component of the compositions of my invention. In general, the reaction between aliphatic dibasic acids and aliphatic diamines proceeds in accordance with the following formula.

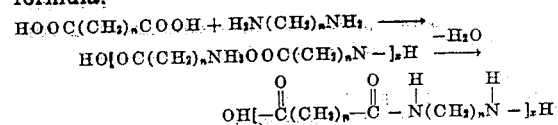

Polyamines in which "n" is from 2 to 6 or more include ethylene diamine, trimethylene diamine, tetramethylene diamine, pentamethylene diamine, hexamethylene diamine, etc.; while aliphatic dibasic acids which may be used include oxalic, malonic, succinic, glutaric, adipic, pimelic, azelaic, sebacic, etc., as well as dimers, and trimers of certain fatty acids, e. g. linoleic and linolenic. Polyamides of dimer and trimer acids have been produced by the Northern Regional Research laboratories of the U. S. Dept. of Agriculture and are now in commercial production.

The molecular weight of the polymer formed may be limited, if desired, by the addition of monoamines or monobasic acids, and addition of one of the main components in more than equivalent amounts. The molecular weight is desirably in the range represented by nylon, which is a polyamide resulting from the reaction of adipic acid with hexamethylene diamine.

For my purposes I prefer to employ in powder or flake form the polymer of adipic acid and hexamethylene diamine known to the trade as "nylon."

More particularly, with respect to the phenolic resins, which constitute the second essential component of the compositions of my invention, these may be broadly identified as phenolic-aldehyde resins which are only partially cured. In general, these materials are produced substantially in accordance with the following formula:

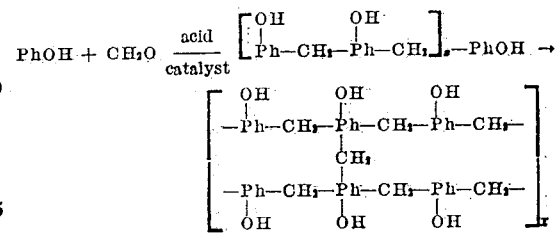

In the above formula, "Ph" signifies a benzene ring. Although I am aware that these polymers can be produced by means of an alkaline catalyst, I prefer for my purposes to utilize those phenol-aldehyde polymers which result when an acid catalyst is used. It will be readily observed that cresol or resorcinol may be substituted for part or all of the phenol in the foregoing reaction and that the aldehyde which is preferably formaldehyde may be substituted in part or in whole by furfural or paraformaldehyde. In general, the reaction proportions are approximately 1 mol of the phenolic material to 1.1–1.6 mols of the aldehyde in aqueous solution, e. g. 40%. The final solution contains from 40% to 60% solids, and most usually is employed at a concentration of about 50% solids.

Alcohol modified phenol-aldehydes may also be employed for my purposes. These resins, utilized in the compositions of this invention, are those which are in a low state of polymerization and hence highly reactive. Such resins are characterized in that alone they do not set to a hard film at ordinary room temperatures but remain relatively soft and pliable. These resins are also alcohol- and acetone-soluble.

For most purposes, the phenolic resin and the polymeric amide are generally used in a ratio of about 4:1 to 2:1 respectively, although concentrations as low as 5% polymeric amide and 95% on dry basic phenolic resin, and concentrations as high as 95% polymeric amide and 5% phenolic resin have been used. Best results are obtained, however, when a ratio of from 10% to 33% by weight of the polymeric amide and 90% to 66% by weight of the phenolic resin on the dry basis is employed. These resins are well known in the art and useful for my purposes when formulated as hereinafter more particularly described. The phenolic resin is usually employed as an approximately 50% solution, i. e. a solids content of about 40 parts per 100 parts by weight of solution.

A third desirable, although not essential, ingredient of the compositions of my invention is a solution which acts as a catalyst for the curing of the clear varnish after application to the surface to be coated. Although the clear varnish of this invention will cure spontaneously after a considerable period of time has elapsed, i. e. a matter of days, or is exposed to heat, it has been found desirable to include in the formulation a catalyst solution which comprises concentrated sulphuric acid, e. g. 95% sulphuric acid. A convenient method for introducing this catalyst is in a suitable thinner such as a Cellosolve ether (monoalkyl ethers of ethylene glycol), e. g. methyl Cellosolve. A suitable catalyst consists of a 10% solution, approximately, of 95% sulphuric acid in methyl Cellosolve, or other such material. Almost any inorganic acid such as sulphuric, hydrochloric, and phosphoric, may be used. However, due to the volatility of some acids, such as hydrochloric acid, and the tendency for certain acidic catalysts to cause extensive cratering during spraying, sulphuric acid has been selected as the most satisfactory material of this type. It should be pointed out that from the standpoint of catalysts, inorganic acids as well as acid reacting salts, such as ammonium chloride and sodium acid sulphate, will also cause the curing reaction to take place. Basic substances, such as sodium hydroxide, will also catalyze the curing reaction, but in the case of such alkaline catalysts, the phenol-aldehyde polymer does not exhibit the solvent resistant characteristics of the acid catalyzed material. The catalyst solution is employed in amounts ranging from about 1% to about 5% by weight of the clear varnish, a particularly satisfactory amount of catalyst being 2.2% by weight of the clear varnish.

For application by spray, the clear varnish containing the catalyst may be thinned with from 75% to 125% by volume with a Cellosolve ether (monoalkyl ethers of ethylene glycol), such as methyl Cellosolve, although, for most purposes, 100% dilution by volume is satisfactory.

A highly satisfactory clear varnish is produced by adding 22.2 lbs. of the catalyst solution (about 10% solution in methyl Cellosolve of sulphuric acid (95%) for each 1,000 lbs. of clear varnish and thinning the resulting mixture with approximately 100% by volume of methyl Cellosolve.

One of the major difficulties encountered in the formulation of a composition comprising a stable, homogeneous solution of a polyamide and a phenol-aldehyde resin was the development of a suitable solvent system therefor. This problem was complicated by the fact that polymeric amide solutions in concentrations as low as 5% gel in from 1 to 4 days after preparation. It was, therefore, necessary to discover suitable stabilizers, or couplers, to prevent this action. It was also found that the addition of materials which were mutual solvents for each of the resinous materials separately, caused slight precipitation when employed as a solvent for the mixture of the resinous materials. It is felt that one reason for the sensitivity of the mixture of the polyamide and the phenol-aldehyde resin toward precipitation upon dilution with such a mutual solvent was that basic as well as acidic catalysts caused polymerization of the phenolic resin, and a slight polymerization may have resulted from the presence of the slightly basic polymeric amide.

In general, it was found that the phenolic resin alone was readily soluble in the lower alcohols, ketones, esters, and glycol ethers, such as methyl Cellosolve; while solvents for the amide were primarily warm, aqueous solutions of lower alcohols, such as ethyl alcohol, (85%) and organic acids such as formic. It was found that the lower alcohol thus employed should be free of any high boiling denaturants, such as turpentine, castor oil, etc. as these denaturants tend to increase in concentration during drying of the coating, and, being non-solvents for either the polyamide or the phenol-aldehyde, would cause discontinuity of the film. With formic acid, somewhat impractical materials were obtained. It was then discovered that a solvent or diluent for the amide should contain hydroxyl or acidic reacting groups in the molecule, such as COOH, $SO_3H$, Cl, Br, F, and the like, together with a relatively low organic residue, i. e. 1 to 7 carbon atoms. Utilizing the knowledge thus acquired, it was found that ethylene dichloride and ethylene chlorohydrin were exceptionally satisfactory diluents.

Other practical effective stabilizers, or couplers, which were found to prevent the gelling of a 10% polyamide solution were ethylene dichloride, and monobutyl-acid-orthophosphate. A variety of stabilizers which are rather impractical for use with the amide include practically all highly acidic materials such as phosphoric, carbolic, and formic acids. In addition, it appears that the phenolic resin serves as an additional stabilizer in the mixture of the polyamide and the phenolic resin as it has been found that the polyamide is soluble in the phenolic resin.

The following solvents have been found to be satisfactory for use in stabilizing the phenolic-amide mixture: ethylene dichloride, propylene dichloride, trichloroethylene, tetrachloroethane, carbon tetrachloride, chloroform, monofluorotrichloromethane, benzyl trichloride, lactic acid, mono-butyl-phosphate, diethyl phosphate, mono-isopropyl-phosphate, and the like.

While the inclusion of these phosphate esters as well as their analogues as stabilizers, or couplers, may seem inconsistent with one of the principal objects of this invention, it has been found unexpectedly that the use of such esters in the compositions of this invention does not deleteriously affect the resistance of the lacquer to the action of organic phosphate esters such as occur in the recently developed hydraulic fluids mentioned above. I prefer, however, to use the phosphorous-free organic stabilizers above described.

In general, the polyamide solution may contain from about 8 to about 12 parts of polyamide, such as, nylon, per 100 parts of polyamide solution. The solvent system for the polyamide solution generally consists of a mixture of a low molecular weight water soluble alcohol, such as methyl, ethyl, or isopropyl alcohols, and an ether alcohol of the type such as may be produced by reacting a low molecular weight aliphatic alcohol with ethylene oxide, e. g. methyl Cellosolve, ethyl Cellosolve, propyl Cellosolve and the butyl Cellosolves. The ratio of 85% alcohol solution to the Cellosolve component is preferably about 70 to 1 although the Cellosolve ingredient may be omitted if desired. The stabilizer or coupler in the polymeric amide solution may be employed in amounts ranging from about 5% to about 30% by weight of the entire polymeric amide solution, and preferably about 17%, or stated on another basis, from about 100% to about 200% of the weight of the dry polymeric amide.

In the formulation of clear varnish, I generally employ about equal parts by weight of the polymeric amide solution and the phenol-aldehyde solution, although I may vary from equal parts by employing the respective solutions in amounts ranging from a ratio of about 60:40 to about 40:60. When mixed in the proportions indicated above, the final composition will contain from about 10% to about 33% of a polymeric amide and from about 90% to about 66% of a catalytically curing phenolic resin, said percentages being calculated on the dry basis. A preferred example of the clear vehicle which constitutes an important part of my invention is one containing 20% of a polymeric amide and 80% of a catalytically curing phenolic resin, said percentages being calculated on the dry basis.

To illustrate the formulation of the solutions which are ultimately blended to yield the clear varnish, the following typical formulation and manufacturing instructions are given. 100 parts by weight of a polymeric amide, e. g. nylon flake, are dissolved in 709.6 parts of 85% ethyl alcohol. The mixture is warmed to about 120° F. and agitated until solution occurs. A second solution containing 169.1 parts of ethylene dichloride, or other suitable stabilizer or coupler as indicated above, 10.2 parts of methyl Cellosolve and 11.1 parts of partially polymerized phenol-formaldehyde resin solution is prepared and added slowly with agitation to the warm nylon solution. It will be observed that this polymeric amide solution totals 1,000 parts. The polymeric amide solution in warm alcohol may contain from 10% to about 20% solids, although I have obtained best results at a concentration of about 15% solids. The higher the concentration of polyamide, the greater the tendency to form gels.

444 parts of the phenol-formaldehyde solution produced, for example, from 1 mol of phenol and 1.5 mols of formaldehyde (40%) is then mixed with 556 lbs. of the polymeric amide solution indicated above.

To the clear varnish thus produced, a catalyst material produced substantially in accordance with the instructions given above and consisting of methyl Cellosolve, or other such thinner, and about 10% by weight of the thinner of a mineral acid, such as sulphuric acid, is added to the clear varnish to the extent of about 2% by weight of the clear varnish. A sprayable clear lacquer can be produced from such clear varnish by thinning the resulting mixture with about 100% by volume of methyl Cellosolve.

The foregoing example may be converted to a materials balance as follows to illustrate more clearly the relative concentrations of the separate ingredients in a clear lacquer containing the catalyst, but prior to thinning for spray application:

| | Parts |
|---|---|
| Polymeric amide (dry)—nylon flake | 55.6 |
| Phenol-formaldehyde (dry) | 222.0 |
| Ethyl alcohol (solvent) | 345.3 |
| Water (solvent) | 272.5 |
| Ethylene dichloride (stabilizer) | 94.1 |
| Methyl Cellosolve (thinner) | 25.5 |
| Sulphuric acid (as 100% H₂SO₄) (catalyst) | 2.3 |

Basing the weights on the same amount of polymeric amide, clear lacquers within the preferred ranges of this invention show the following variations in the remaining components:

| | Parts |
|---|---|
| Polymeric amid (dry) | 55.6 |
| Phenol-aldehyde resin (dry) | 100–350 |
| Low M. W. water sol. alcohol | 250–450 |
| Water | 140–520 |
| Stabilizer | 50–120 |
| Thinner | 0–50 |
| Acid curing catalyst | 1–5 |

In order to compare various varnish bases with respect to resistance to phosphate ester-containing fluids and exposure to water, panels of 24 ST–3 Alclad aluminum .020 inch x 3 inches x 6 inches were given a phosphoric acid etch in accordance with specification AN–TT–C–516, amendment 4 dated November 27, 1944, "Coatings, Protective, Organic (for Aircraft); general specifications (methods for sampling and testing)." One-half of the panels so etched were spray coated directly with the coatings to be tested, while the remaining panels were given 1 spray coat of zinc chromate primer (specification AN–P–656 dated August 25, 1947, "Primer; Zinc Chromate"), and then coated with the material. All coatings were cured 48 hours at room temperature prior to testing. In the case of the zinc chromate primed panels, the primer was cured 48 hours at room temperature prior to application of the film-forming material. Panels were then cut into 3 equal sections, and one section was immersed for 48 hours in organic phosphate ester-containing hydraulic fluid at 120° F., the second section for one week in hydraulic fluid at room temperature, and the remaining section for 24 hours in water at room temperature. The sections were carefully examined at the completion of the specified test periods for softening or loss of adhesion.

Numerous resinous materials were tested in accordance with the above procedure including cellulose nitrate, cellulose acetate butyrate, cellulose acetate, zein, de-waxed shellac, vinylidene chloride and acrylonitrile copolymer, methyl methacrylate polymer, tung-dehydrated castor oil-phenolic varnish, urea formaldehyde poweracid catalyst varnish, hydroxy ethyl cellulose, and soya alkyd. With the exception of the corn protein (zein) and the various cellulosic materials, the other various bases failed on exposure to the hydraulic fluid under the conditions of the test. The zein resin and the hydroxy ethyl cellulose varnish bases passed the hydraulic fluid tests, but failed the water test. The other cellulose materials possessed only fair hydraulic fluid resistance but could be stripped from the test panels when wet. The alkyd resin softened excessively when immersed in the organic phosphate ester-containing hydraulic fluid.

The only compositions which withstood the effect of the hydraulic fluid and resisted the deleterious effects of water were the compositions of this invention.

The following examples are a typical group of formulations with manufacturing instructions for the production of pigmented varnishes of various colors.

*Example 1*

55.3 parts of iron blue, 5.6 parts of titanium dioxide (rutile), 1.7 parts of lecithin, 14.3 parts of phenol-formaldehyde solution, and 40.1 parts of methyl Cellosolve, or the like, are ground in a ball mill to Hegman 6H grind. To the ground product are added a mixture of 407 parts of phenol-formaldehyde solution and 476 parts of the polymeric amide solution described above. This is added to the pigment in the ball mill and the grinding continued for a period of about 3 hours. 69.7 parts of catalyst are added for each 1,000 parts of the dark blue varnish and the resulting mixture may be thinned by adding 100% by volume of a Cellosolve ether such as methyl Cellosolve. The ratio of phenol-formaldehyde to nylon in this example is about 4:1 on a dry basis.

*Example 2*

Following substantially the same procedure, a black lacquer may be produced from a pigmentary mixture consisting of 41.3 parts of lamp black, 1.5 parts of lecithin, 148 parts of phenol-formaldehyde solution and 66.7 parts of methyl Cellosolve; and a clear varnish consisting of a mixture of 594 parts of the polymeric amide solution and 148.5 parts of the phenol-formaldehyde solution. This mixture is ground for 3 hours as in the previous example. About 70 lbs. of the catalyst material for each 1,000 lbs. of paint is added, and the mixture thinned with methyl Cellosolve in the manner indicated above. The ratio of phenol-formaldehyde to nylon in this example is about 2:1 on a dry basis.

*Example 3*

A red lacquer may be produced in substantially the same manner by grinding a pigment composition consisting of 209 parts of cadmium lithopone medium red, 3 parts of lecithin, 123.4 parts of phenol-formaldehyde solution, and 49.2 parts of methyl Cellosolve to a Hegman 6H grind in a ball mill. A mixture of 123.4 parts of phenol-formaldehyde solution and 492 parts of polymeric amide solution is added and the grinding continued for an additional 3 hours. Again, in the pigmented lacquer, about 7% by weight of catalyst is employed and the resulting mixture thinned with a Cellosolve ether for spraying. The ratio of phenol-formaldehyde to nylon in this example is about 2.5 to 1 on a dry basis.

*Example 4*

A green lacquer may be produced from a pigment composition consisting of 41.3 parts of permansa green B, 1.5 parts of lecithin, 73.5 parts of phenol-formaldehyde solution and 14.7 parts of methyl Cellosolve and grinding to a Hegman 6H grind in a ball mill. To this is added a mixture of 221 parts of phenol-formaldehyde solution, 589 parts of polymeric amide solution, and 59 parts of methyl Cellosolve. The latter clear varnish is added to the grind and the milling continued for a period of 3 hours. The ratio of phenol-formaldehyde to nylon in this example is about 2.75 to 1 on a dry basis.

It will be noted that in the preparation of the polymeric amide solution used in the manufacture of a clear varnish, about 1% by weight of the polymeric amide of the phenol-formaldehyde solution was added to the polymeric amide solution before blending with the major proportion of the phenolic resin solution. The explanation for the inclusion of a small amount of the phenolic resin in the initial polymeric amide solution is that it serves as a safeguard against the precipitation of the polymeric amide should the phenol-formaldehyde be added suddenly and without stirring to the polymeric amide solution. In other words, the presence of a small amount of the phenol-formaldehyde resin desensitizes the amide solution and prepares it to accept more readily a large amount of the phenol-formaldehyde resin.

A phenol-formaldehyde resin which has been found particularly suitable for use in accordance with this invention may be prepared by reacting under reflux about 96 parts by weight of 37-40% formaldehyde solution, 100 parts by weight of phenol, 10 parts by weight of anhydrous sodium sulphite and 15 parts by weight of glycerine for about 75 minutes. The viscosity at this point is about 100 k. v. (k. v. representing the kinematic viscosity which is equal to the centipoises/special gravity) and indicates a desirable end point of this phase of the reaction. Diluent may be added to decrease the solids content from about 64% to about 50%, at which concentration it has been found desirable to use this resin. Satisfactory products may be made, however, at the higher concentrations of solids.

When formulated in accordance with the above, the lacquer or varnish compositions of this invention have been found to set to touch in a relatively short period of time, usually between 1 and 2 hours. The resulting film is resistant to water, durable, and flexible enough so that it can be used in coating electrical wiring so as to make identification possible even after the wiring has been exposed to the extreme solvent effects of hydraulic fluids of the nonflammable type characterized by the presence therein of organic phosphate esters, e. g. tricresyl phosphate. It is to be understood that the lacquer compositions of this invention either clear or pigmented may also be used to replace lacquers currently available on the market for the uses commonly associated with lacquers in general. The lacquer bases of this invention are also useful in the formulation of metallic paints using powdered aluminum, brass, copper, or copper-zinc alloy pigments.

Other modes of applying the principle of this invention may be employed instead of those specifically set forth above, changes being made as regards the details herein disclosed, provided the elements set forth in any of the following claims, or the equivalent of such be employed.

I, therefore, particularly point out and distinctly claim as my invention:

1. A clear lacquer, stable to the solvent effect of organic phosphate esters which consists essentially of a stable, homogeneous, aqueous-alcoholic solution of (a) 55.6 parts of a polymeric amide resin of hexamethylene diamine and adipic acid, (b) 222 parts of a partially cured, acid curing phenol-formaldehyde resin, (c) 94.1 parts of ethylene dichloride, (d) 2.3 parts of sulphuric acid, (e) 345.8 parts of ethyl alcohol, (f) 272.5 parts of water, and (g) 25.5 parts of ethylene glycol monomethyl ether.

2. A composition of matter suitable for use in the formulation of clear and pigmented coating compositions comprising a mixture of (a) a polymeric amide solution consisting essentially of a mixture of (1) a solution of a polymeric amide of an alkylene diamine of from 2 to 6 carbon atoms and a polybasic saturated aliphatic acid of from 2 to 8 carbon atoms in an aqueous solution of a water soluble aliphatic alcohol and containing from 10% to 20% solids and (2) a stabilizer solution amounting to from 5% to 30% by weight of the polymeric amide solution, said stabilizer being a normally liquid halogenated saturated aliphatic hydrocarbon of from 1 to 7 carbon atoms and containing a plurality of halogen atoms; and (b) a 40%—60% aqueous solution of a partially cured, acid curing phenol aldehyde resin, said components (a) and (b) being in intermixture in a weight ratio of from 40:60 to 60:40, respectively, calculated as the solutions.

3. A composition of matter suitable for use in the formulation of clear and pigmented coating compositions comprising a mixture of (a) a polymeric amide solution consisting essentially of a mixture of (1) a solution of the polymeric amide resin of hexamethylene diamine and adipic acid in an 85% aqueous solution of ethyl alcohol and containing from 10% to 20% solids, and (2) a stabilizer solution amounting to from 5% to 30% by weight of the polymeric amide solution, said stabilizer being ethylene dichloride; and (b) a 40%-60% aqueous solution of partially cured, acid curing phenol-formaldehyde resin, said components (a) and (b) being in a weight ratio of from 40:60 to 60:40, respectively, calculated as solutions.

4. A lacquer base containing 1,000 parts of the composition of claim 3 and about 22 parts of a 10% solution of sulphuric acid in a monoalkyl ether of ethylene glycol.

DAVID N. BEAUCHAMP.

References Cited in the file of this patent

UNITED STATES PATENTS

| Number | Name | Date |
|---|---|---|
| 2,214,397 | Austin | Sept. 10, 1940 |
| 2,293,760 | Peters | Aug. 25, 1942 |
| 2,302,557 | Langkammerer | Nov. 17, 1942 |
| 2,322,779 | Gocher et al. | June 29, 1943 |
| 2,328,398 | Roskosky | Aug. 31, 1943 |